United States Patent
Itoh et al.

(10) Patent No.: US 9,013,124 B2
(45) Date of Patent: Apr. 21, 2015

(54) REVERSE CURRENT PROTECTION CONTROL FOR A MOTOR

(75) Inventors: Kazunori Itoh, Tokyo (JP); Yasushi Kitamura, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 448 days.

(21) Appl. No.: 13/396,353

(22) Filed: Feb. 14, 2012

(65) Prior Publication Data

US 2013/0207578 A1 Aug. 15, 2013

(51) Int. Cl.
*H02P 3/00* (2006.01)
*G05B 11/28* (2006.01)
*H02P 27/08* (2006.01)
*H02P 3/22* (2006.01)

(52) U.S. Cl.
CPC .......................................... *H02P 3/22* (2013.01)

(58) Field of Classification Search
CPC ............ B60L 2240/421; B60L 3/0061; B60L 11/1805; B60L 15/2009; B60L 3/003; B60L 7/12; H02P 21/146; H02P 21/14; H02P 6/18; H02P 21/0035; H02P 21/06; H02P 27/08; H02P 6/182; H02P 7/29; H02P 3/24; H02P 6/24; B60T 17/22; B60T 8/885; B60W 30/18109; B66B 1/32; F16D 2121/24
USPC ............... 318/375, 563, 400.21, 400.22, 782, 318/612, 759
See application file for complete search history.

(56) References Cited

U.S. PATENT DOCUMENTS

| | | | |
|---|---|---|---|
| 6,153,989 A | 11/2000 | Kardash et al. | |
| 6,456,909 B1* | 9/2002 | Shimada et al. | 701/22 |
| 6,528,968 B2 | 3/2003 | Seima et al. | |
| 7,309,967 B2 | 12/2007 | Moser et al. | |
| 8,098,031 B2 | 1/2012 | Chang | |
| 2003/0102833 A1 | 6/2003 | Murakami | |
| 2008/0122417 A1* | 5/2008 | Ng et al. | 323/282 |
| 2009/0218972 A1 | 9/2009 | Yamamoto et al. | |
| 2010/0231147 A1* | 9/2010 | Milesi et al. | 318/375 |
| 2011/0288748 A1* | 11/2011 | Richter et al. | 701/103 |

FOREIGN PATENT DOCUMENTS

| | | |
|---|---|---|
| JP | 08223975 | 8/1996 |
| JP | 3615127 | 1/2005 |
| JP | 2007252058 | 9/2007 |

* cited by examiner

*Primary Examiner* — Paul Ip
*Assistant Examiner* — Iftekhar Mustafa
(74) *Attorney, Agent, or Firm* — Alan A. R. Cooper; Frank D. Cimino

(57) ABSTRACT

A method is provided. A command to correspond to a target speed of a motor is received. A rotational speed of the motor is measured, and a brake-to-off ratio for a braking interval is calculated based at least in part on the rotation speed, the target speed, a braking parameter. An off state for an inverter that is coupled to motor is induced during an off portion of the braking interval, and a brake signal is applied to the inverter during a braking portion of the braking interval.

17 Claims, 5 Drawing Sheets

US 9,013,124 B2

REVERSE CURRENT PROTECTION CONTROL FOR A MOTOR

TECHNICAL FIELD

The invention relates generally to motor control and, more particularly, to control of a brushless direct current (DC) motor.

BACKGROUND

Brushless DC motors are employed in a wide variety of applications, and one application, for example, for brushless DC motors is as a spindle motor for a hard disk drive (HDD) or optical disk drive (i.e., digital versatile disk or DVD player). For some of these applications (like DVD players), speed control of the motor can be very important, as the motors will frequently change speed. This means that there are transient periods of braking and acceleration.

For braking, in particular, the motor should slow quickly to generally ensure that proper functionality is preserved, and, in FIG. 1, an example of a system 100-1 employs a braking scheme that can be seen. In this example, the motor 110 is a three-phase brushless DC motor, where each phase PHA to PHC is respectively coupled to transistor pairs Q1/Q2, Q3/Q4, and Q5/Q6 (which as shown are NMOS transistors) of inverter 106. The controller 104-1 applies pulse width modulation (PWM) signals PWM1 to PWM6 to the inverter 106 to control the phases PHA to PHC of the motor 110 (i.e., drive the motor 110). During braking, though, the motor 110 generates a reverse current or negative current through pins U, V, and W of integrated circuit (IC) or motor driver 102-1 to the supply pin VDD. When this occurs, the controller 104-1 closes switch S of discharge circuit 108 so as to activate the current mirror Q7 and Q8 (which, as shown, are PMOS transistors) by coupling the drain of transistor Q8 to the supply pin GND. This allows the reverse current or negative current to be discharged through resistor R2. One problem with this arrangement, however, is that transistors Q7 and Q8 can occupy a large portion of the area of IC 102-1 in order to be sufficiently large enough to carry the reverse current, so as an alternative (shown in FIG. 2), the discharge circuit 108 can be removed and several different types of braking schemes be employed (as shown in FIGS. 3 and 4).

For one scheme (which is shown in FIG. 3), controller 104-2 can inactivate or "turn off" transistors Q1 to Q6, placing the inverter 106 in a high impedance or HIZ mode. Mechanical friction (i.e., from bearings) can be used to slow the rotational speed of the motor 110. Usually, to allow this to occur, the speed command issued to the controller 104-2 changes from code L1 (which corresponds to a target rotational speed ω1) to code L3 (which corresponds to a target rotational speed that is not shown) at time T1 so as to allow a negative or reverse current to be generated. At this point, the inverter 106 is placed in a HIZ (off) state or mode, but the losses due to friction are usually so low that the motor 110 does not reach the desired target speed ω2 (which is associated with code L2) within the desired deceleration period (i.e., between times T1 and T2). Instead, the motor 110 reaches a much higher speed ω3 at time T2.

For another scheme (which is shown in FIG. 4), a short braking period can be employed. During the period between times T3 and T4, the speed command issued to controller 104-2 is set to code L3 (which corresponds to a target rotational speed that is not shown). As a result, the controller 104-2 places inverter 106 in a braking mode or state. In this braking state, transistors Q1, Q3, and Q5 are inactivated or "turned off," while transistors Q2, Q4, and Q6 are activated or "turned on." This allows a reverse or negative current to flow back through the pin COMM so as to be dissipated by resistor R1. This use of this short braking period is effective in slowing motor 110 to the desired or target speed within the desired deceleration period (i.e., between times T3 and T4), but the speed is not stable. There is some "ringing" that does occur.

Therefore, there is a need for an improved method and/or apparatus of braking with a brushless DC motor.

Some examples of conventional systems are: U.S. Pat. No. 6,528,968; U.S. Pat. No. 7,309,967; U.S. Pat. No. 8,098,031 U.S. Patent Pre-Grant Publ. No. 2009/0218972.

SUMMARY

An embodiment of the present invention, accordingly, provides an apparatus. The apparatus comprises an inverter that is configured to be coupled to a motor; and a controller having: a pulse width modulation (PWM) generator that is coupled to the inverter; a reverse current detector that is coupled to the PWM; control logic that is coupled to the PWM generator and that is configured to receive a target speed signal; and reverse current logic that is coupled to the reverse current detector and the control logic, wherein the reverse current logic is configured to receive the target speed signal, a braking parameter, and a rotational speed parameter, and wherein, when a reverse current is detected, the reverse current logic is configured to calculate a brake-to-off ratio based for a brake interval that is based at least in part on the target speed signal, the braking parameter, and the rotational speed parameter.

In accordance with an embodiment of the present invention, the reverse current logic is configured to provide a control signal to the controller so as to apply the brake-to-off ratio to the inverter.

In accordance with an embodiment of the present invention, the reverse current is configured to iteratively calculate a plurality of brake-to-off ratios for a plurality of brake intervals to achieve a target speed indicated by the target speed signal.

In accordance with an embodiment of the present invention, the reverse current logic further comprises a finite state machine.

In accordance with an embodiment of the present invention, the reverse current detector further comprises: a resistor that is coupled to the PWM generator; and a comparator that is coupled to the resistor.

In accordance with an embodiment of the present invention, the rotational parameter is configured to be a rotational speed of the motor.

In accordance with an embodiment of the present invention, a method is provided. The method comprises receiving a command to correspond to a target speed of a motor; measuring a rotational speed of the motor; calculating a brake-to-off ratio for a braking interval based at least in part on the rotation speed, the target speed, a braking parameter; inducing an off state for an inverter that is coupled to motor during an off portion of the braking interval; and applying a brake signal to the inverter during a braking portion of the braking interval.

In accordance with an embodiment of the present invention, the rotational speed further comprises a first rotational speed, and wherein the braking interval further comprises a first braking interval, and wherein the method further comprises: measuring a second rotational speed of the motor after the first braking interval; and if a calculated back electromotive force (back-emf) for the second rotational speed is greater than a calculated back-emf for the target speed, repeating the steps of calculating, inducing, and applying for a second braking interval.

In accordance with an embodiment of the present invention, the braking signal further comprises a plurality of PWM signals that correspond to braking.

In accordance with an embodiment of the present invention, the method further comprises detecting a reverse current.

In accordance with an embodiment of the present invention, the motor is a three-phase brushless direct current (DC) motor.

In accordance with an embodiment of the present invention, an apparatus is provided. The apparatus comprises a motor; a motor driver having: an inverter that is coupled to the motor; and a controller having: a PWM generator that is coupled to the inverter; a reverse current detector that is coupled to the PWM; control logic that is coupled to the PWM generator and that is configured to receive a target speed signal; and reverse current logic that is coupled to the reverse current detector and the control logic, wherein the reverse current logic is configured to receive the target speed signal, a braking parameter, and a rotational speed parameter, and wherein, when a reverse current is detected, the reverse current logic is configured to calculate a brake-to-off ratio based for a brake interval that is based at least in part on the target speed signal, the braking parameter, and the rotational speed parameter.

In accordance with an embodiment of the present invention, the reverse current logic is coupled to the motor so as to receive the rotational speed.

In accordance with an embodiment of the present invention, the motor is a three-phase brushless DC motor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
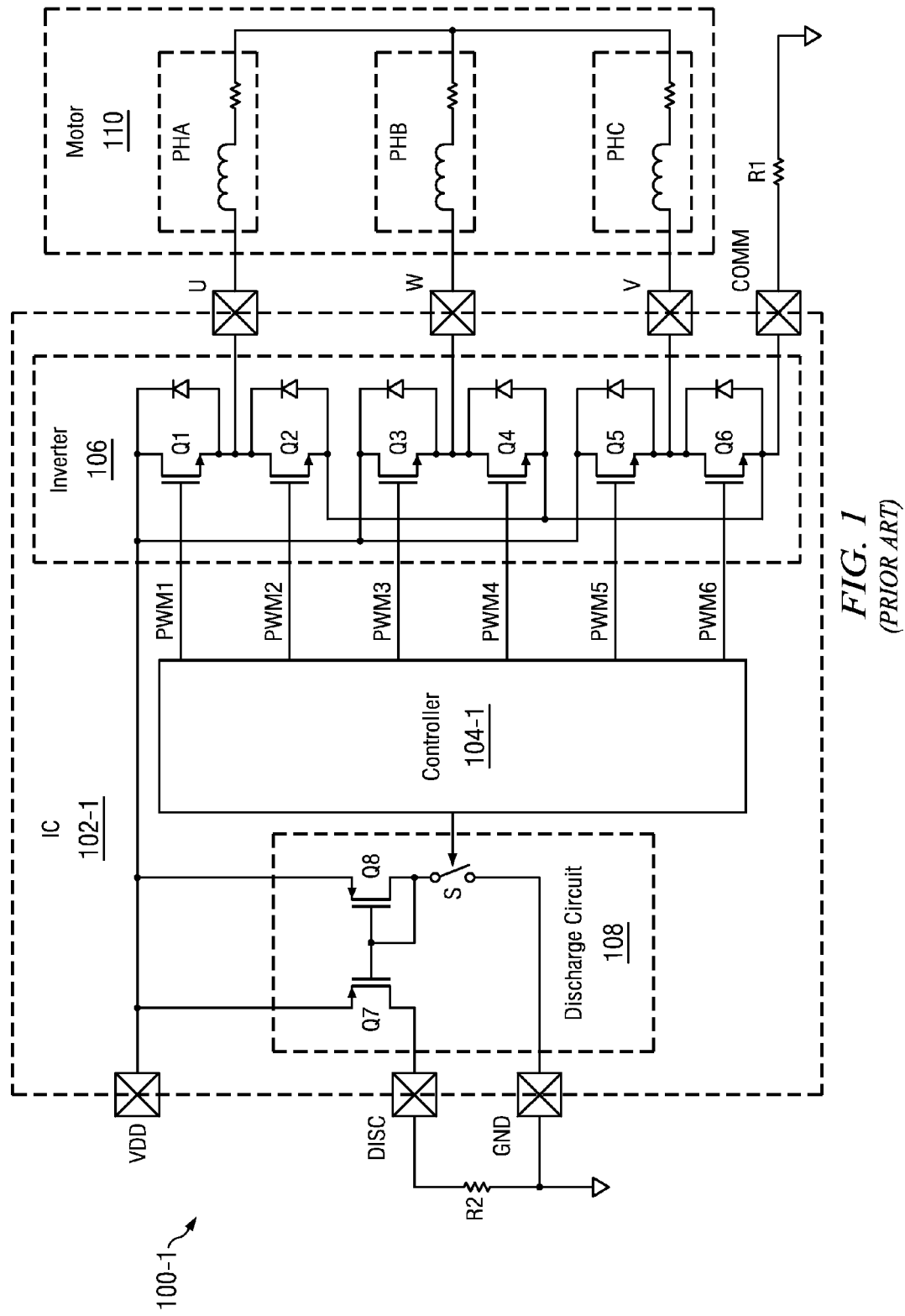
FIGS. 1 and 2 are diagrams of examples of conventional systems.
Figure 2:
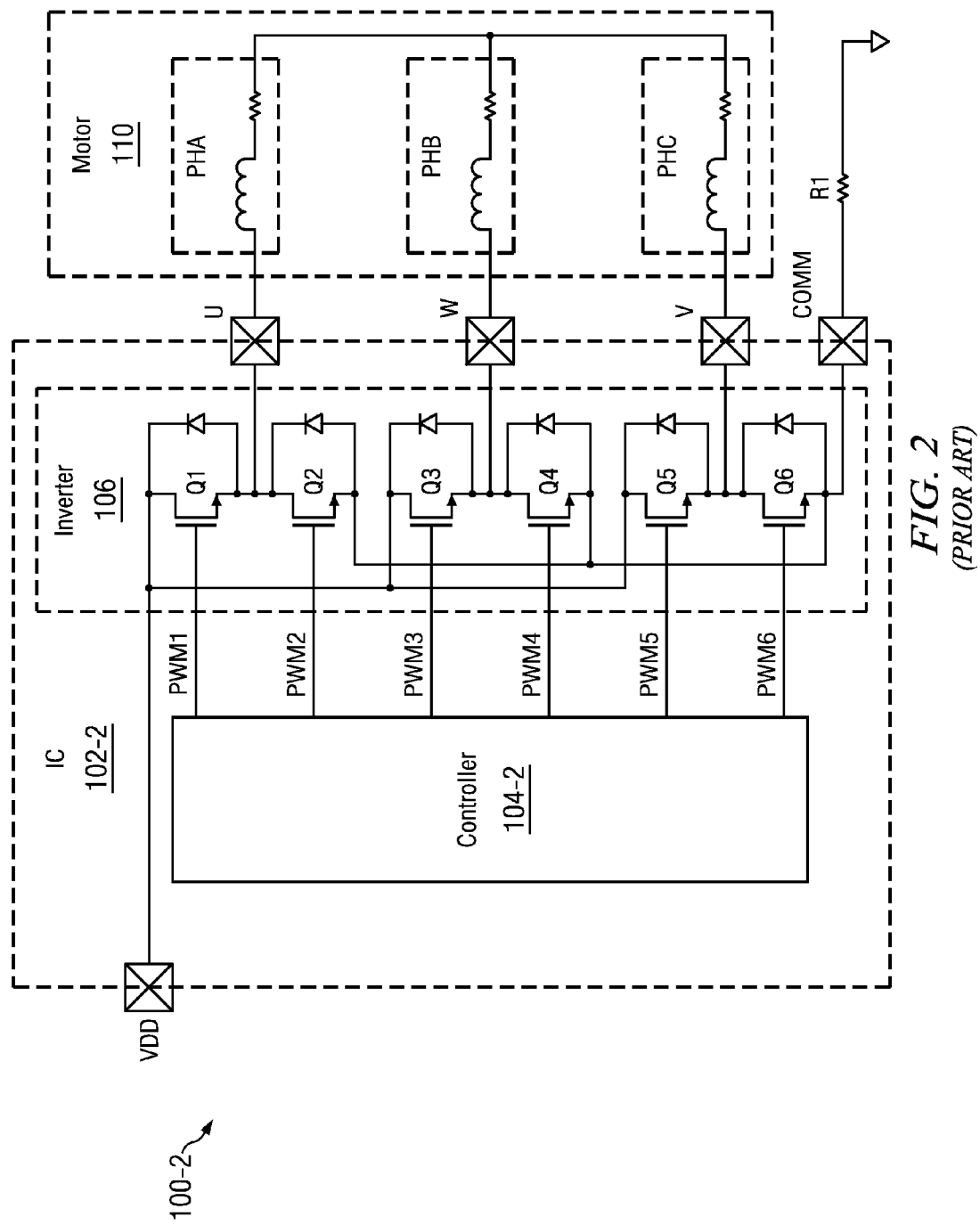
Figure 3:
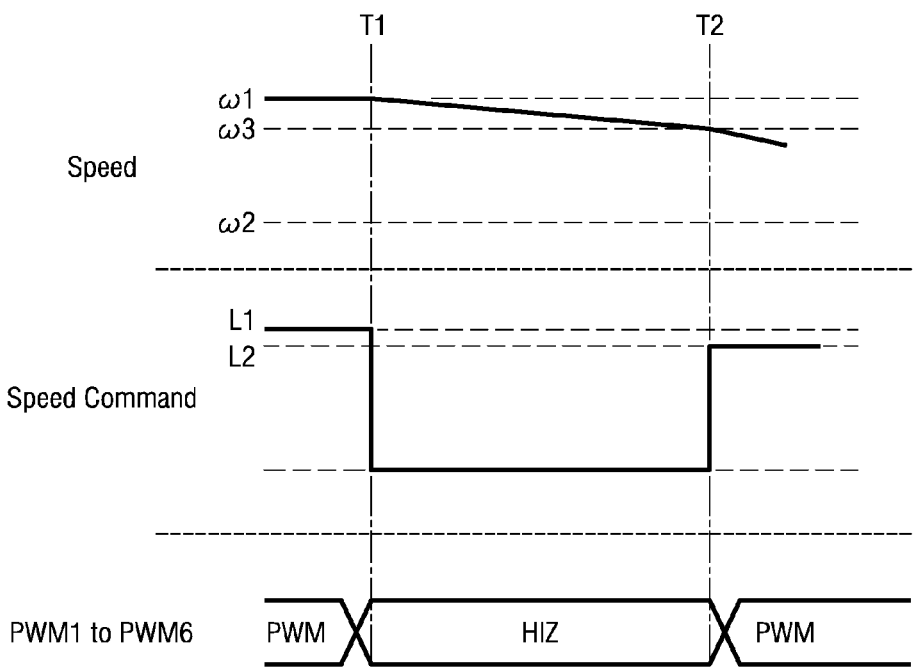
FIGS. 3 and 4 are diagrams depicting conventional braking schemes for the system of FIG. 2.
Figure 4:
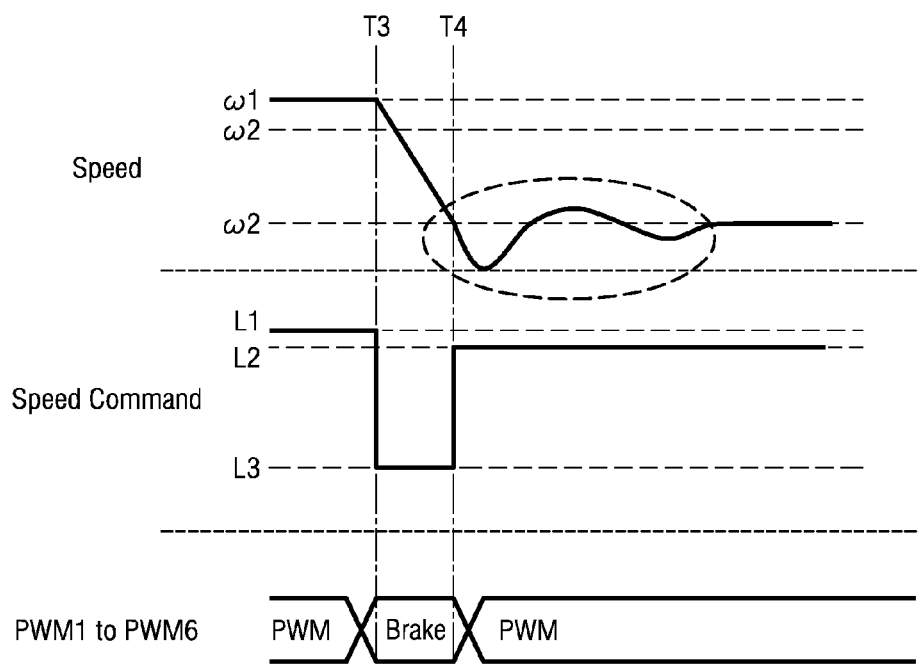

Refer now to the drawings wherein depicted elements are, for the sake of clarity, not necessarily shown to scale and wherein like or similar elements are designated by the same reference numeral through the several views.

Figure 5:
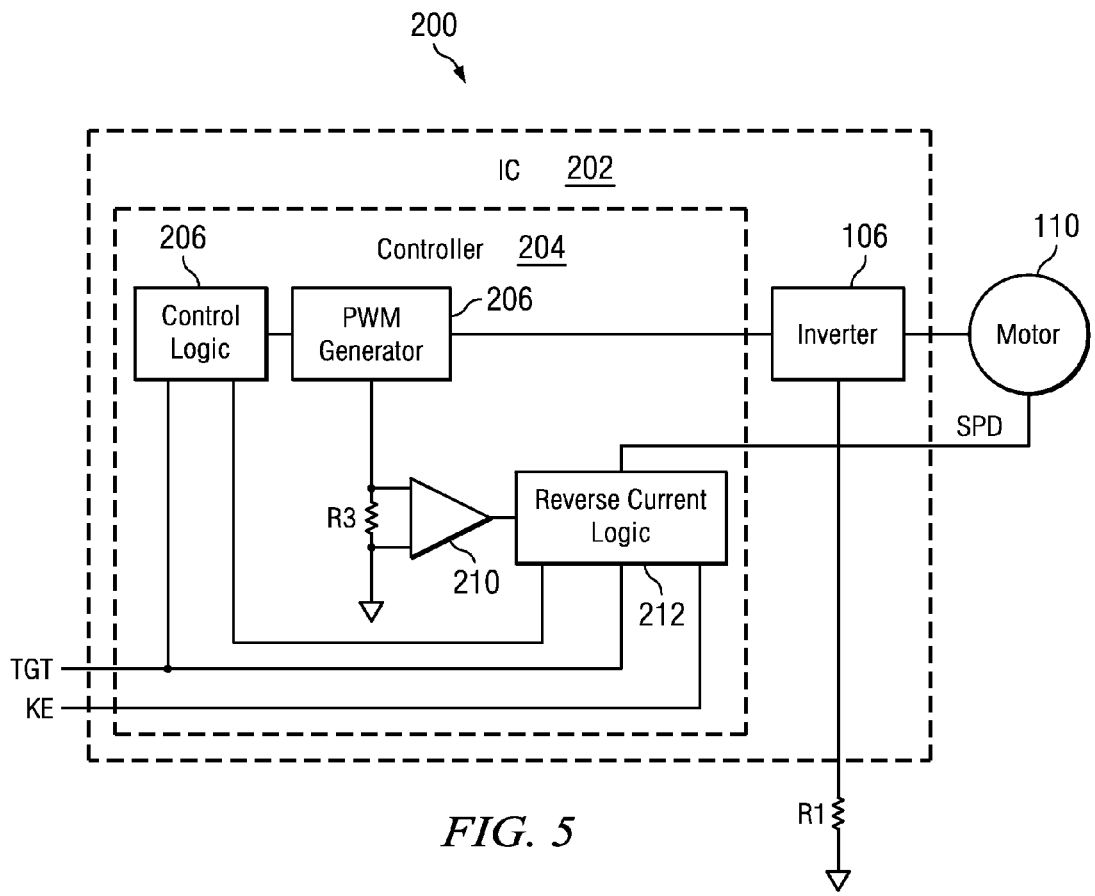
FIG. 5 is a diagram of an example of a system in accordance with the present invention.
Figure 7:
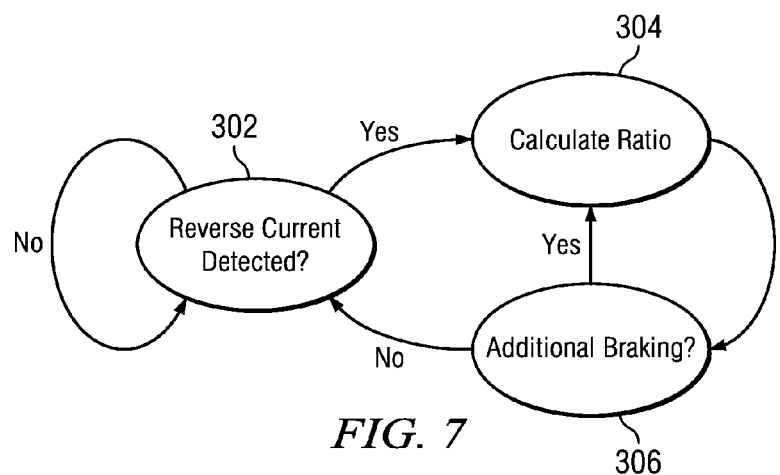
FIG. 7 is an example state diagram for the reverse current logic of FIG. 5.

Turning to FIG. 5, an example of a system 200 in accordance with the present invention can be seen. System 200 is similar in construction to that of systems 100-1 and 100-2, except that in IC or motor driver 202 there is a controller 204 that performs an adaptive braking scheme. In operation, a target speed signal TGT is provided to the control logic 206 and the reverse current logic 212 (which can, for example, be a finite state machine or FSM). Based on this target signal TGT, the control logic 206 can provide PWM signals PWM1 to PWM6 to inverter 106 (similar to systems 100-1 and 100-2) to drive the motor 110. When a reverse current is detected by the reverse current detector (which generally comprises resistor R2 and comparator 210), the reverse current logic 212 controls the control logic 206 so as to apply adaptively braking the motor 110. Alternatively, another current measurement or resistive element (like a transistor) may be used as the part of the reverse current detector.

Figure 6:
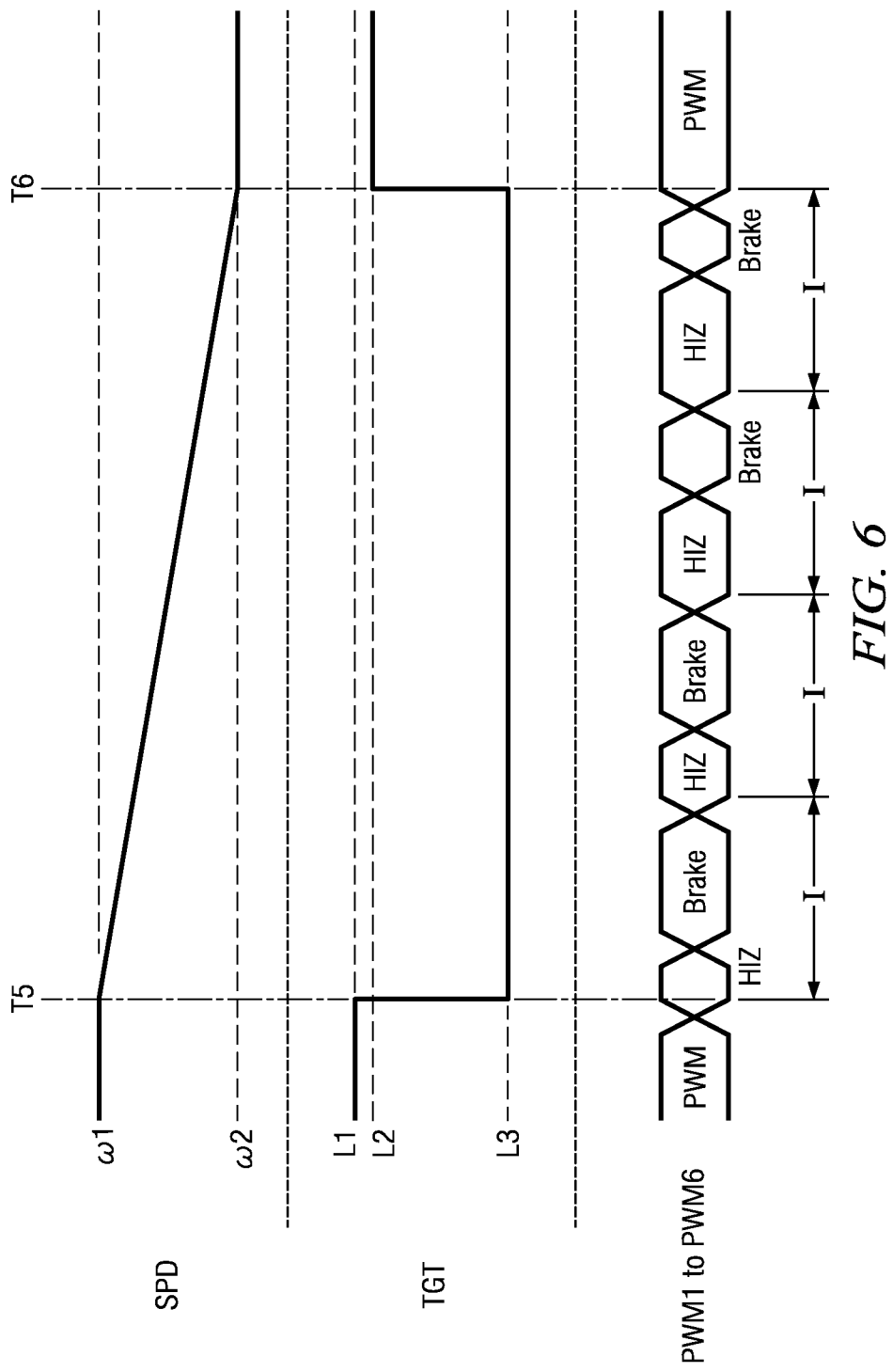
FIG. 6 is a diagram depicting an example of a braking scheme for the system of FIG. 5.

The adaptive braking scheme (which is shown in FIGS. 5 and 6) is able to slow or decelerate the motor 110 to a desired rotational speed within a target deceleration time. As shown, the target deceleration time is the period between times T5 and T6. Similar to systems 100-1 and 100-2, the target signals TGT changes from code L1 to code L3 at time T5 and from code L3 to code L2 at time T6. Between times T5 and T6, the reverse current detector detects the reverse or negative current (as shown with state 302). The reverse current logic 212 then calculates (in state 304) a brake-to-off or brake-to-HIZ ratio for a braking interval I. The braking interval I is generally a predetermined or preset interval having a generally fixed length that can be programmably changed, and the brake-to-off ratio is the relative portions of the braking interval I that controller 204 places the inverter 106 in a HIZ (off) mode or state (i.e., transistors Q1 to Q6 being deactivated) and a braking mode or state (i.e., transistors Q1, Q3, and Q5 are inactivated and transistors Q2, Q4, and Q6 are activated). Typically, the brake-to-off ratio is calculated from the target speed signal TGT, the braking parameter KE, and the rotational speed parameter SPD (i.e., measured rotational speed from motor 110). For example, the brake-to-off ratio may be calculated by:

$$\frac{HIZ}{HIZ + \text{Brake}} = \frac{I - \text{Brake}}{I} = \frac{TGT \cdot \text{Gain}}{KE \cdot SPD} \qquad (1)$$

Once the braking interval has been completed, a determination is made in state 306 as to whether additional braking should be performed using a comparison of calculated back electromotive forces (back-emfs) of the measured rotational speed (from signal SPD) and target speed (from signal TGT); namely:

$$\left(1 - \frac{KE \cdot SPD}{TGT \cdot \text{Gain}}\right) > 0 \rightarrow \text{additional braking} \qquad (2)$$

$$\left(1 - \frac{KE \cdot SPD}{TGT \cdot \text{Gain}}\right) \leq 0 \rightarrow PWM \qquad (3)$$

Usually, as shown in FIG. 6, the brake-to-off ratio becomes smaller (i.e., duration for the braking mode decreases while the duration for the HIZ mode increase) over successive braking intervals I. This allows the motor 110 to be decelerated within a desired deceleration interval without use of a bulky discharge circuit (i.e., discharge circuit 108) and without ringing.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
    an inverter that is configured to be coupled to a motor; and
    a controller having:
        a pulse width modulation (PWM) generator that is coupled to the inverter;
        a reverse current detector that is coupled to the PWM;
        control logic that is coupled to the PWM generator and that is configured to receive a target speed signal; and
        reverse current logic that is coupled to the reverse current detector and the control logic, wherein the reverse current logic is configured to receive the target speed signal, a braking parameter, and a rotational speed parameter, and wherein, when a reverse current is detected, the reverse current logic is configured to calculate a brake-to-off ratio based for a brake interval that is based at least in part on the target speed signal, the braking parameter, and the rotational speed parameter.

2. The apparatus of claim 1, wherein the reverse current logic is configured to provide a control signal to the controller so as to apply the brake-to-off ratio to the inverter.

3. The apparatus of claim 2, wherein the reverse current is configured to iteratively calculate a plurality of brake-to-off ratios for a plurality of brake intervals to achieve a target speed indicated by the target speed signal.

4. The apparatus of claim 3, wherein the reverse current logic further comprises a finite state machine.

5. The apparatus of claim 4, wherein the reverse current detector further comprises:
    a resistor that is coupled to the PWM generator; and
    an comparator that is coupled to the resistor.

6. The apparatus of claim 5, wherein the rotational parameter is configured to be a rotational speed of the motor.

7. A method comprising:
    receiving a command to corresponding to a target speed of a motor;
    measuring a rotational speed of the motor;
    calculating a brake-to-off ratio for a braking interval based at least in part on the rotation speed, the target speed, a braking parameter;
    inducing an off state for an inverter that is coupled to motor during an off portion of the braking interval; and
    applying a brake signal to the inverter during a braking portion of the braking interval;
    wherein the rotational speed further comprises a first rotational speed, and wherein the braking interval further comprises a first braking interval, and wherein the method further comprises:
    measuring a second rotational speed of the motor after the first braking interval; and
    if a calculated back electromotive force (back-emf) for the second rotational speed is greater than a calculated back-emf for the target speed, repeating the steps of calculating, inducing, and applying for a second braking interval;
    wherein the method further comprises detecting a reverse current, wherein the brake off ratio is employs at least the reverse current.

8. The method of claim 7, wherein the braking signal further comprises a plurality of PWM signals that correspond to braking.

9. The method of claim 7, wherein the motor is a three-phase brushless direct current (DC) motor.

10. An apparatus comprising:
    a motor;
    a motor driver having:
        an inverter that is coupled to the motor; and
        a controller having:
            a PWM generator that is coupled to the inverter;
            a reverse current detector that is coupled to the PWM;
            control logic that is coupled to the PWM generator and that is configured to receive a target speed signal; and
            reverse current logic that is coupled to the reverse current detector and the control logic, wherein the reverse current logic is configured to receive the target speed signal, a braking parameter, and a rotational speed parameter, and wherein, when a reverse current is detected, the reverse current logic is configured to calculate a brake-to-off ratio based for a brake interval that is based at least in part on the target speed signal, the braking parameter, and the rotational speed parameter.

11. The apparatus of claim 10, wherein the reverse current logic is configured to provide a control signal to the controller so as to apply the brake-to-off ratio to the inverter.

12. The apparatus of claim 11, wherein the reverse current is configured to iteratively calculate a plurality of brake-to-off ratios for a plurality of brake intervals to achieve a target speed indicated by the target speed signal.

13. The apparatus of claim 12, wherein the reverse current logic further comprises a finite state machine.

14. The apparatus of claim 13, wherein the reverse current detector further comprises:
    a resistor that is coupled to the PWM generator; and
    a comparator that is coupled to the resistor.

15. The apparatus of claim 14, wherein the rotational parameter is configured to be a rotational speed of the motor.

16. The apparatus of claim 15, wherein the reverse current logic is coupled to the motor so as to receive the rotational speed.

17. The apparatus of claim 16, wherein the motor is a three-phase brushless DC motor.

* * * * *